US012308556B2

(12) United States Patent
Zou et al.

(10) Patent No.: US 12,308,556 B2
(45) Date of Patent: May 20, 2025

(54) CABLE CONNECTOR WITH IMPROVED TERMINAL AND WIRE HOLDING PORTIONS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Cheng-Jun Zou, Kunshan (CN); Bin Peng, Kunshan (CN); Jian-Kuang Zhu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 427 days.

(21) Appl. No.: 17/828,034

(22) Filed: May 31, 2022

(65) Prior Publication Data

US 2022/0393387 A1 Dec. 8, 2022

(30) Foreign Application Priority Data

Jun. 7, 2021 (CN) ......................... 202110631754.7
Jun. 7, 2021 (CN) ......................... 202121260382.3

(51) Int. Cl.

*H01R 13/506* (2006.01)
*H01R 13/10* (2006.01)
*H01R 13/424* (2006.01)
*H01R 13/436* (2006.01)
*H01R 13/58* (2006.01)

(52) U.S. Cl.

CPC ......... *H01R 13/506* (2013.01); *H01R 13/424* (2013.01); *H01R 13/582* (2013.01); *H01R 13/10* (2013.01); *H01R 13/4361* (2013.01)

(58) Field of Classification Search

CPC .. H01R 13/506; H01R 13/424; H01R 13/582; H01R 13/10; H01R 13/516; H01R 13/4361; H01R 13/111
See application file for complete search history.

(56) References Cited

U.S. PATENT DOCUMENTS 4,108,527 A * 8/1978 Douty .................. H01R 13/514 439/465
7,845,992 B2 * 12/2010 Glick ..................... H01R 4/185 439/843
8,043,117 B2 10/2011 Blakborn et al.
9,379,492 B2 6/2016 Rosenberger
(Continued)

FOREIGN PATENT DOCUMENTS

TW I683492 B 1/2020

*Primary Examiner* — Renee S Luebke
*Assistant Examiner* — Paul D Baillargeon
(74) *Attorney, Agent, or Firm* — Ming Chieh Chang

(57) ABSTRACT

A cable connector includes an outer housing, an inner housing including a first housing and a second housing assembled with each other, and a cable assembly retained between the first housing and the second housing. The cable assembly includes a pair of terminals, two wires, and a sleeve. The second housing defines a group of first holding portions for holding the wires. The first housing and the second housing each define a group of second holding portions for commonly holding the sleeve.

6 Claims, 9 Drawing Sheets

(56) References Cited

U.S. PATENT DOCUMENTS

| | | | | |
|---|---|---|---|---|
| 10,103,500 | B2 | 10/2018 | Rosenberger | |
| 10,389,062 | B2 | 8/2019 | Rosenberger | |
| 11,101,602 | B2 * | 8/2021 | Maesoba ............ | H01R 13/6474 |
| 2021/0336387 | A1 | 10/2021 | Little | |

* cited by examiner

CABLE CONNECTOR WITH IMPROVED TERMINAL AND WIRE HOLDING PORTIONS

BACKGROUND OF THE DISCLOSURE

1. Field of the Disclosure

The present disclosure relates to a cable or plug connector including an inner housing with improved holding portions for holding a cable assembly.

2. Description of Related Arts

Electrical connectors used in an automotive field necessarily requires a higher reliability than conventional electrical connectors and the electrical connectors are ensured to have a tight connection between an inside and an outside of the electrical connector, especially in an environment subject to vibration and shock. In a two-terminal structure of a cable connector, a connection between terminals, wires connected to the terminals, and a cable sleeve surrounding the wires may shake or become loosen under vibration and shock. Especially for the wire, the shaking between the two wires will affect an impedance of the electrical connector, which results in impedance fluctuations and affects the performance of the electrical connector. Similarly, the shaking between the terminals and the cable sleeve will also affect the impedance of the electrical connector.

Therefore, an improved cable electrical connector is desired to overcome said problem.

SUMMARY OF THE DISCLOSURE

An object of the invention is to provide a cable connector to improve a reliability of a cable assembly.

In order to achieve above-mentioned object, a cable connector comprises: an outer housing; an inner housing retained in the outer housing and comprising a first housing and a second housing assembled with each other and commonly defining two front passageways and a rear passageway behind the two front passageways; and a cable assembly retained between the first housing and the second housing, the cable assembly comprising a pair of terminals, a pair of wires connected with corresponding terminals, respectively, and a sleeve wrapping the two wires, the terminals and the wires being accommodated within the front passageways, the sleeve being accommodated within the rear passageway; wherein the second housing defines a group of first holding portions for holding the wires, and each of the first housing and the second housing defines a group of second holding portions for commonly holding the sleeve.

Other objects, advantages and novel features of the disclosure will become more apparent from the following detailed description when taken in conjunction with the accompanying drawings.

DETAILED DESCRIPTION OF THE PREFERRED EMBODIMENT

Figure 1:
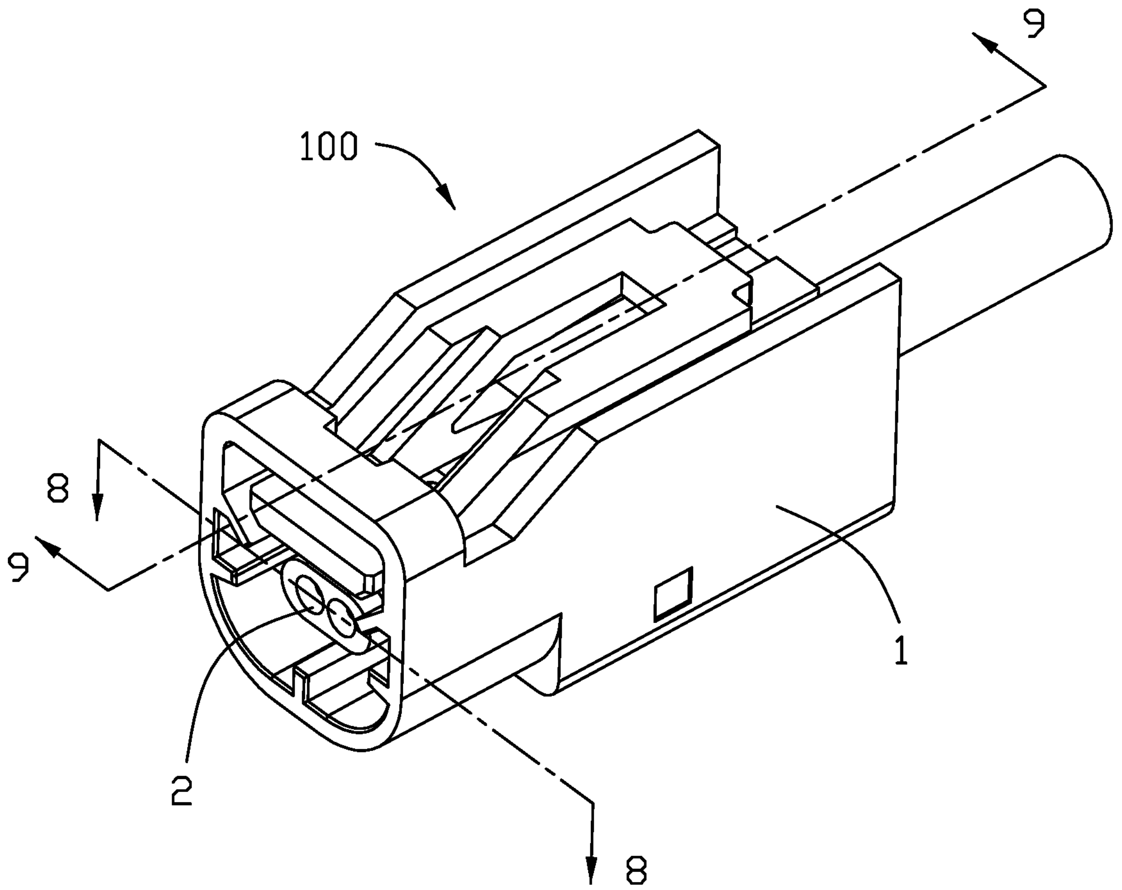
FIG. 1 is a perspective view of a cable connector of this present invention.

Reference will now be made to the drawing figures to describe the preferred embodiment of the present invention in detail.

Figure 2:
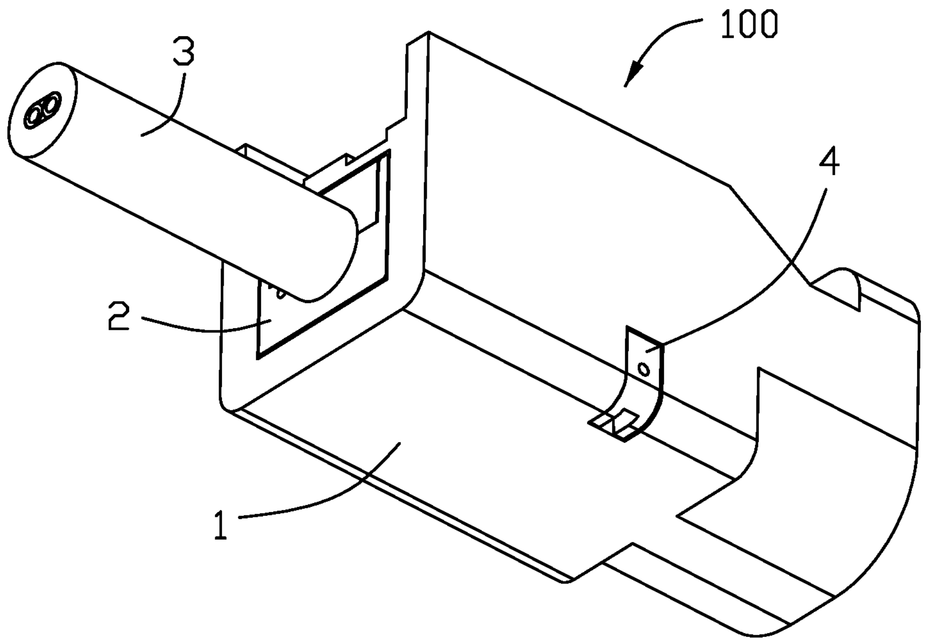
FIG. 2 is an another perspective view of the cable connector in FIG. 1.
Figure 3:
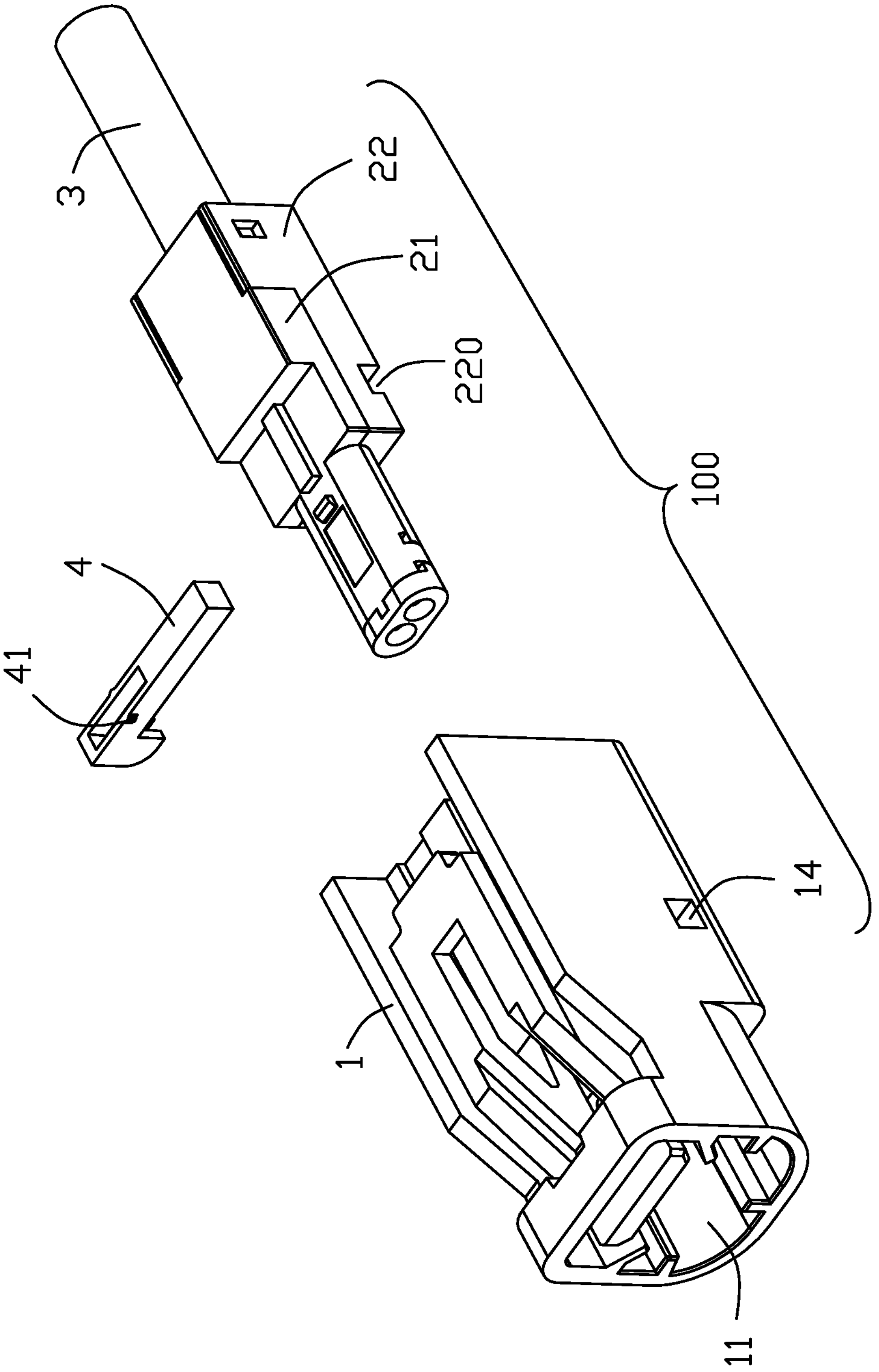
FIG. 3 is an exploded perspective view of the cable connector in FIG. 1.

Referring to FIGS. 1-3, a plug or cable connector 100 of the present invention is used in automotive application, and comprises an outer housing or shell 1, an inner housing 2 assembled and retained in the outer housing 1, and a cable assembly 3 retained in the inner housing 2 made from a first housing 21 or an upper half and a second housing 22 or a lower half assembled with each other.

The cable connector 100 further includes an L-shaped latch 4. The outer housing 1 defines a first hole 14 running through the outer housing 1 along a transverse direction perpendicular to a front-rear direction. The inner housing 2 defines a second hole 220 along the transverse direction, which is recessed from a bottom of the second housing 22. The latch 4 is commonly accommodated in the first and second holes for restricting a movement of the first housing 21 and the second housing 22 along the front-rear direction. The latch 4 has a protrusion 41, and the second housing 22 defines a groove 24 clearly shown in FIG. 6 receiving the protrusion 41, so that the latch 4 can be stably held in the long second hole 220.

Figure 4:
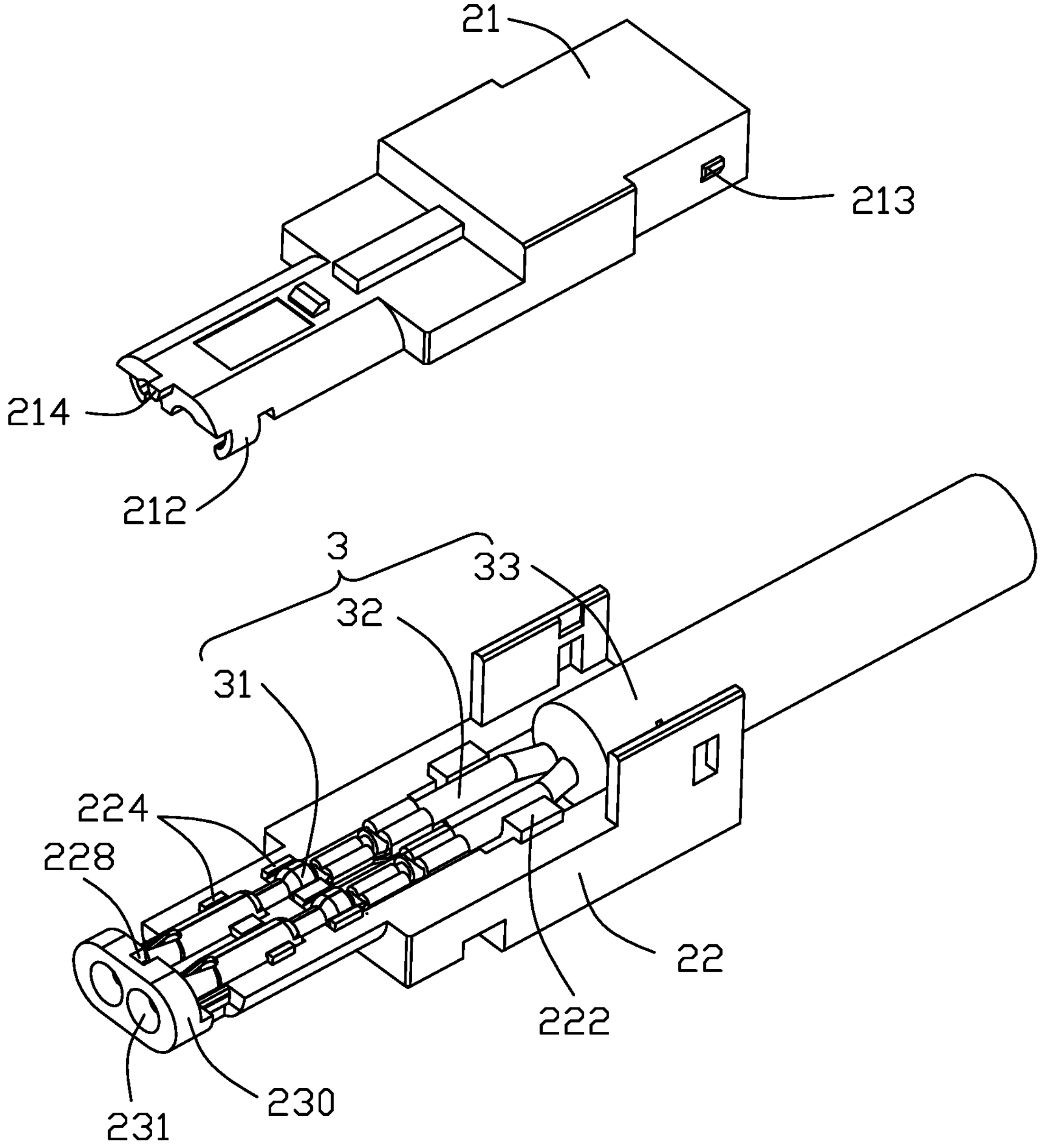
FIG. 4 is an exploded perspective view of the cable connector in FIG. 1.
Figure 5:
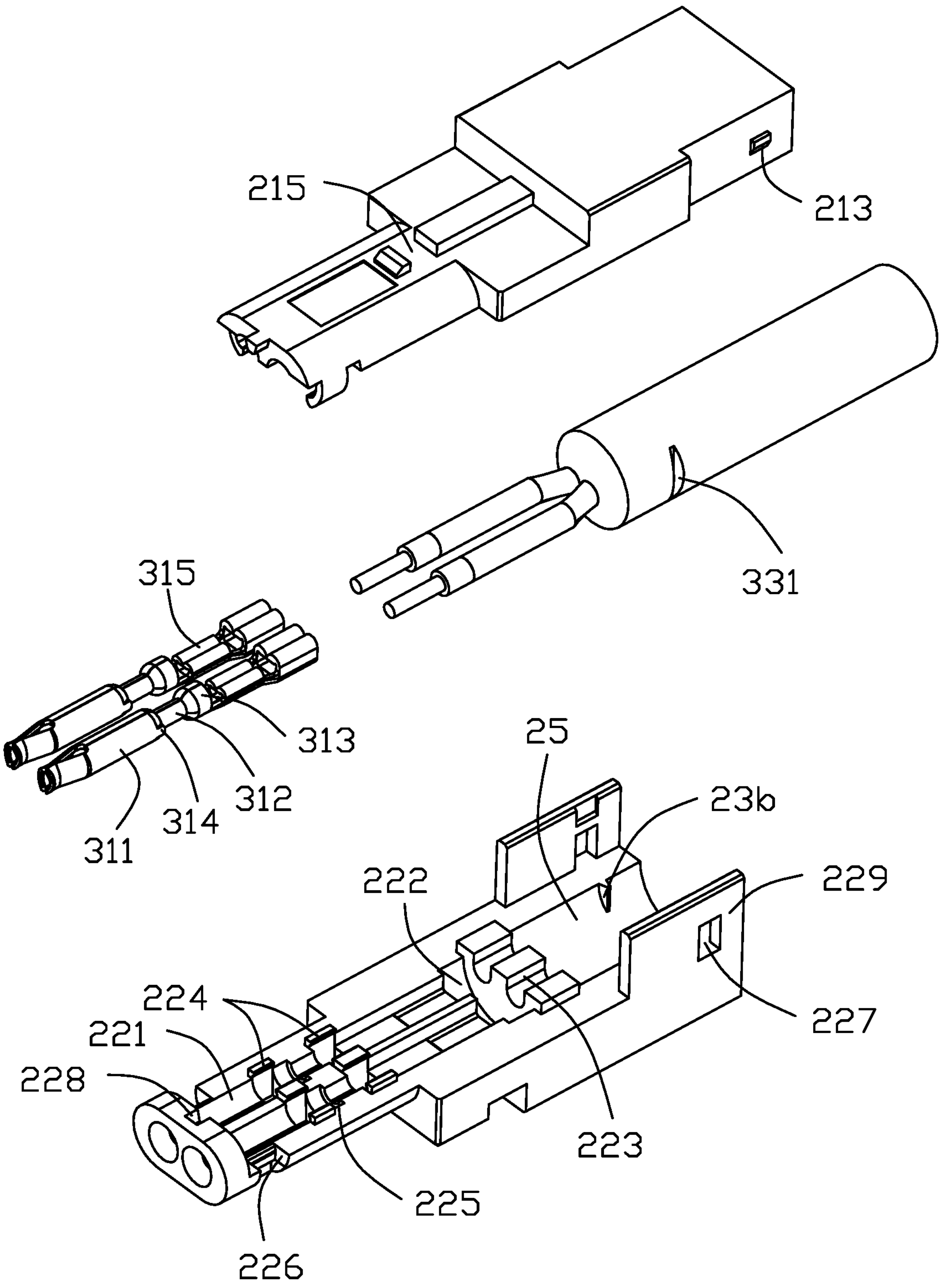
FIG. 5 is a further exploded perspective view of the cable connector in FIG. 4.
Figure 6:
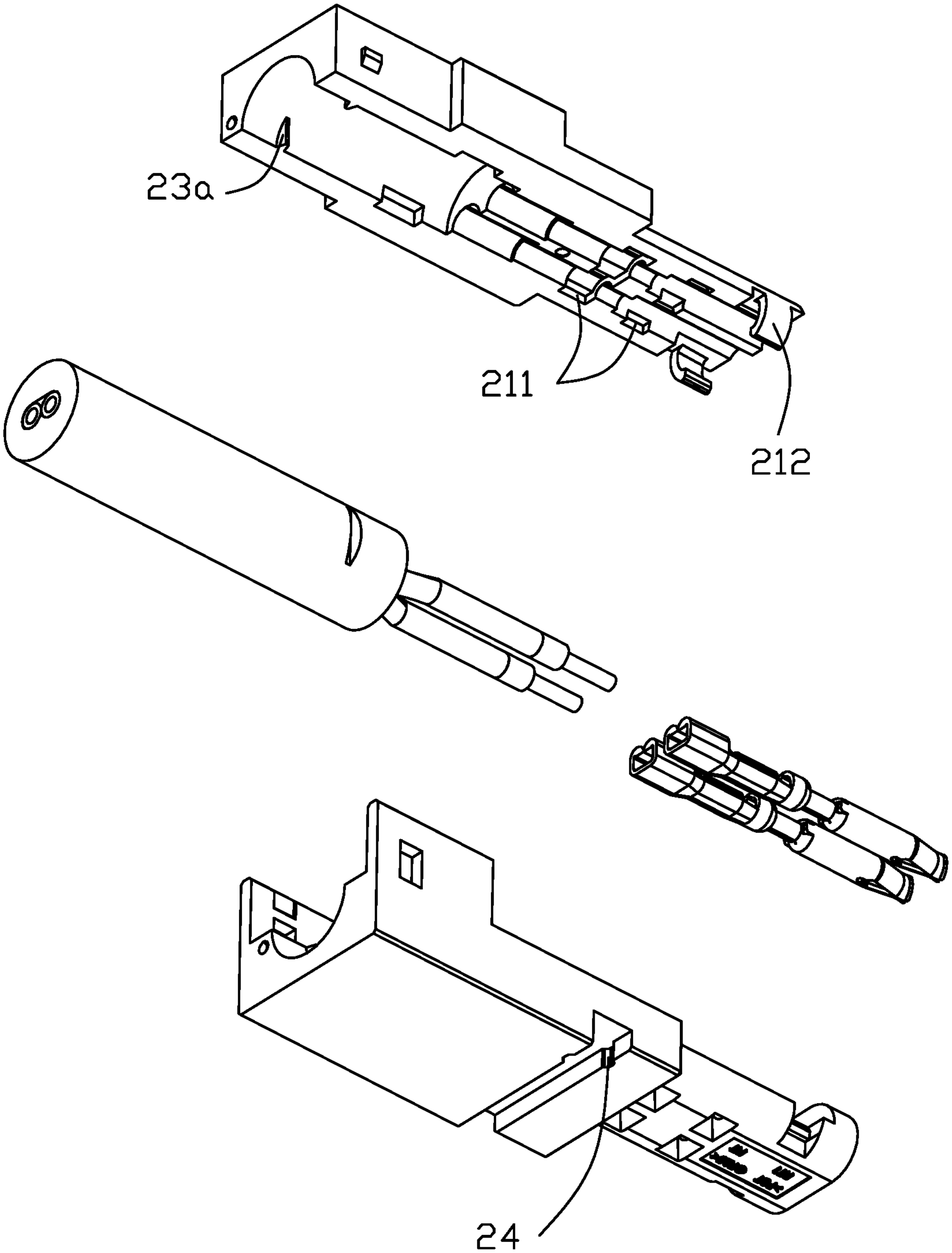
FIG. 6 is an another exploded perspective view of the cable connector in FIG. 5.

Referring to FIGS. 4-6, the inner housing 2 comprises the first housing 21 and the second housing 22 assembled with each other and the cable assembly 3 is retained between the first housing 21 and the second housing 22. The cable assembly 3, along a front to rear direction, comprises a pair of terminals 31, two wires 32 connected with the pair of terminals 31, and a sleeve 33 wrapping the wires 32 with a front portion of the wires exploded to an outside of the sleeve 33. The first housing 21 and the second housing 22 are assembled together along an upright direction and commonly defined two front passageways 221 which two are parallel to each other and a rear passageway 25 behind the two front passageways 221. The pair of the terminals 31 and the wires 32 accommodate in the front passageways 221, respectively. The sleeve 33 accommodates in the rear passageway 25. The second housing 22 defines a group of first holding portions 222 for holding the two wires 32 and two groups of third holding portions 224 for holding the terminals 31. The first and housing each defines a group of second holding portions 23*a*, 23*b*, cooperating to hold the sleeve 33. In this embodiment, the sleeve 33 defines a slot 331 vertically extending at opposite sides thereof, the second holding portions 23*a*, 23*b* of each of the first housing and the second housing projects from opposite inner sides of the rear passageway 25, in a protrusions shape. The second holding portions 23*a*, 23*b* of the first and the second housing on a same side are nailed into one same slot 331, so as to fix the sleeve 33 in the inner housing 2.

Two wires 32 are located in interfering grooves 223 defined on the first holding portion 222, which can be a part of the front passageways 221. The exposed wires 32, i.e., the front ends of the wires separate from each other with a lager distance than the rear portions of wires 32 wrapped in the sleeve 33. Therefore, the exposed wires can be assembled into and retained in the interfering passageways 223, which ensures the unchanged distance between the two wires 32 and avoids an impedance fluctuations caused by the shaking of the wires 32. The first holding portion 222 can be integrally formed with the second housing 22, or be separately formed and then assembled in the second housing 22. In this embodiment, the first holding portion 222 is integrally formed with the second housing 22.

Each terminal 31 comprises a front contacting portion 311 for mating with a mating terminal, a middle portion 313 and a rear wire-connecting portion 315 extending from the middle portion 313. A shrinking portion 312 is formed between the contact portion 311 and the middle portion 313, the shrinking portion 312 has a smaller radio diameter than the contacting portion 311 and the middle portion 313, thereby forming a dumbbell structure, that is, two larger ends with a small middle part. The front passageways 221 are shaped correspondingly the dumbbell structure, so as to limit the terminals 31 along the front-rear direction.

The second housing 22 defines two groups of third holding portions 224, a front group for holding contacting portion 311 and a rear group for holding the middle portion 313. The third holding portions 224 protrude upwards beyond the passageways 221 to fitly clap the contacting portion and the middle portion, and are received in corresponding recesses 211 defined on the first housing 21. Therefore, the terminals 31 are prevented from moving along the upright direction. A rear end of the contacting portion partially are teared and extends rearwards linearly, thereby forming two abutting portions 314 with a plane cutting face. The abutting portions 314 press rearward against a step 225 defined in the passageways 221 to prevent the terminals 31 from moving rearwards.

The second housing 22 further defines a front mating portion 230 with two mating holes 231. The first housing 21 comprises a pair of embracing hooks 212 of an arc-shaped structure and extend towards to the second housing 22. The embracing hooks 212 are received in two fixing grooves 226 defined on the second housing 22 and behind the mating portion 230. A pair of locking openings 227 defined at a rear end of the second housing 22 are locked with a pair of locking blocks 213 defined on the first housing. The second housing 22 has two raised walls 229 extending upwards, and the locking openings 227 penetrate through the raised walls 229 in a transverse direction perpendicular to the front-rear direction. Therefore, the first and the second housing are retained with each other. The embracing hooks 212 and the second housing 22 and the mating portion 230 complete along the front-rear direction. A front positioning rib 214 extends forward from a front end of the first housing 21 and is received in a positioning groove 228 for guiding and positioning during an assembling process of the first and second housing. The positioning rib 214 is located at a middle of a front surface of the first housing 21. Therefore, the first housing 21 and the second housing 22 are precisely assembled and fixed with each other.

The sleeve 33 defines two slots 331 vertically extending at two sides thereof, the second holding portions 23*a*, 23*b* of the first and second housing are held in the slots 331 to fix the sleeve. Two protrusions from the same side of the first and second housing are collectively accommodated in the same slot on one side of the sleeve 33. Conventional connectors often provide sharp ribs or serrations to clamp the sleeve 33, which will cause damage to the sleeve 33. The second holding portions 23*a*, 23*b* and the slots 331 of the present invention can control a cutting position on the sleeve 33 in advance, to avoid accidental damage. Meanwhile, an engagement of the second holding portions 23*a*, 23*b* and the slots 331 can ensure a holding force between the inner housing 2 and the sleeve 33, and avoid impedance fluctuation, which caused by external stress transmitted to the wire cores or terminals through the cable sleeve and causing the wire cores or terminals shaking.

Figure 7:
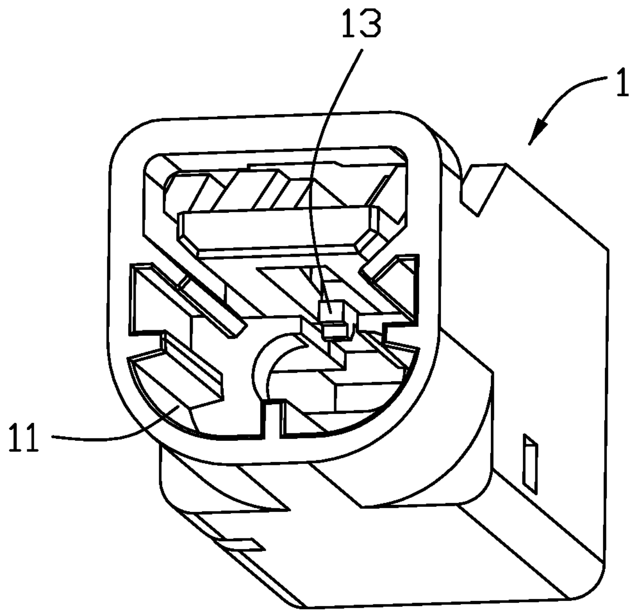
FIG. 7 is a perspective view of an outer housing in FIG. 3.
Figure 8:
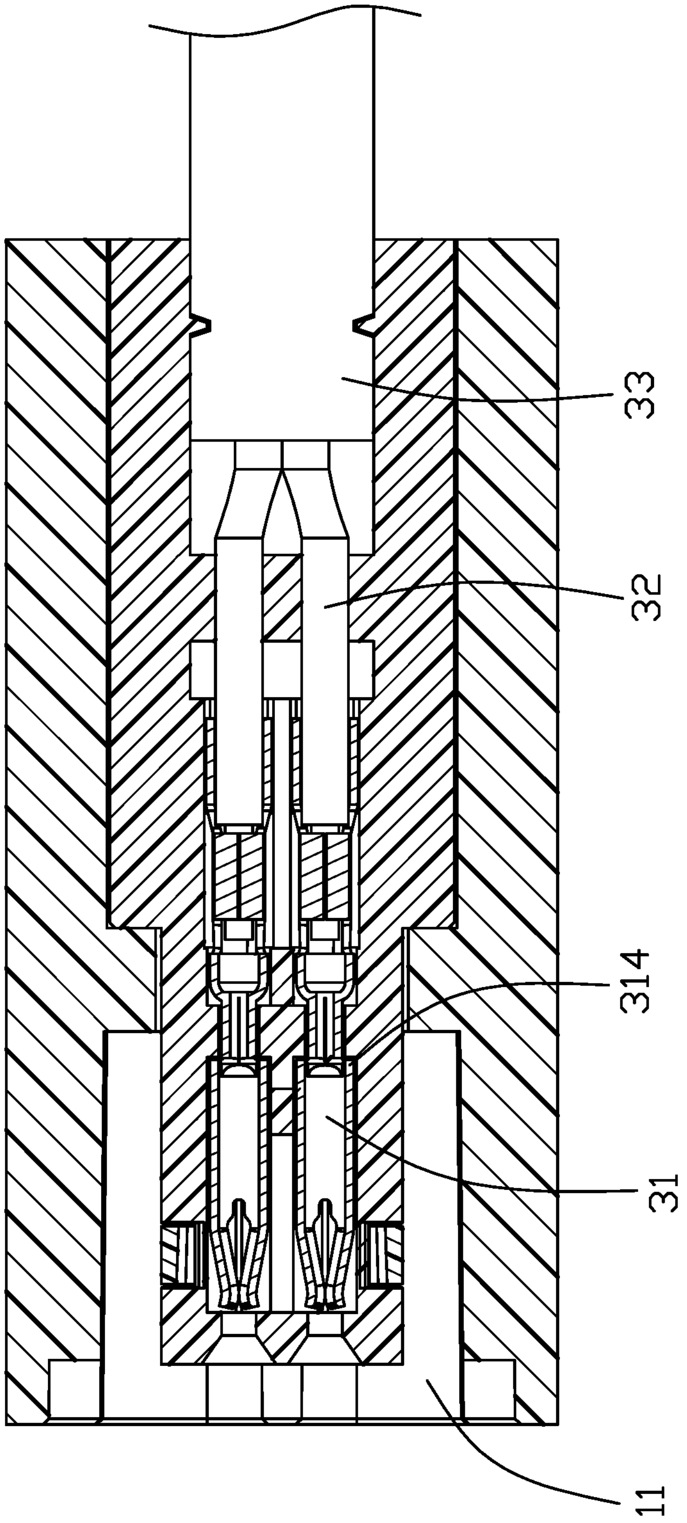
FIG. 8 is a cross-sectional view of the cable connector taken along lines 8-8 in FIG. 1.
Figure 9:
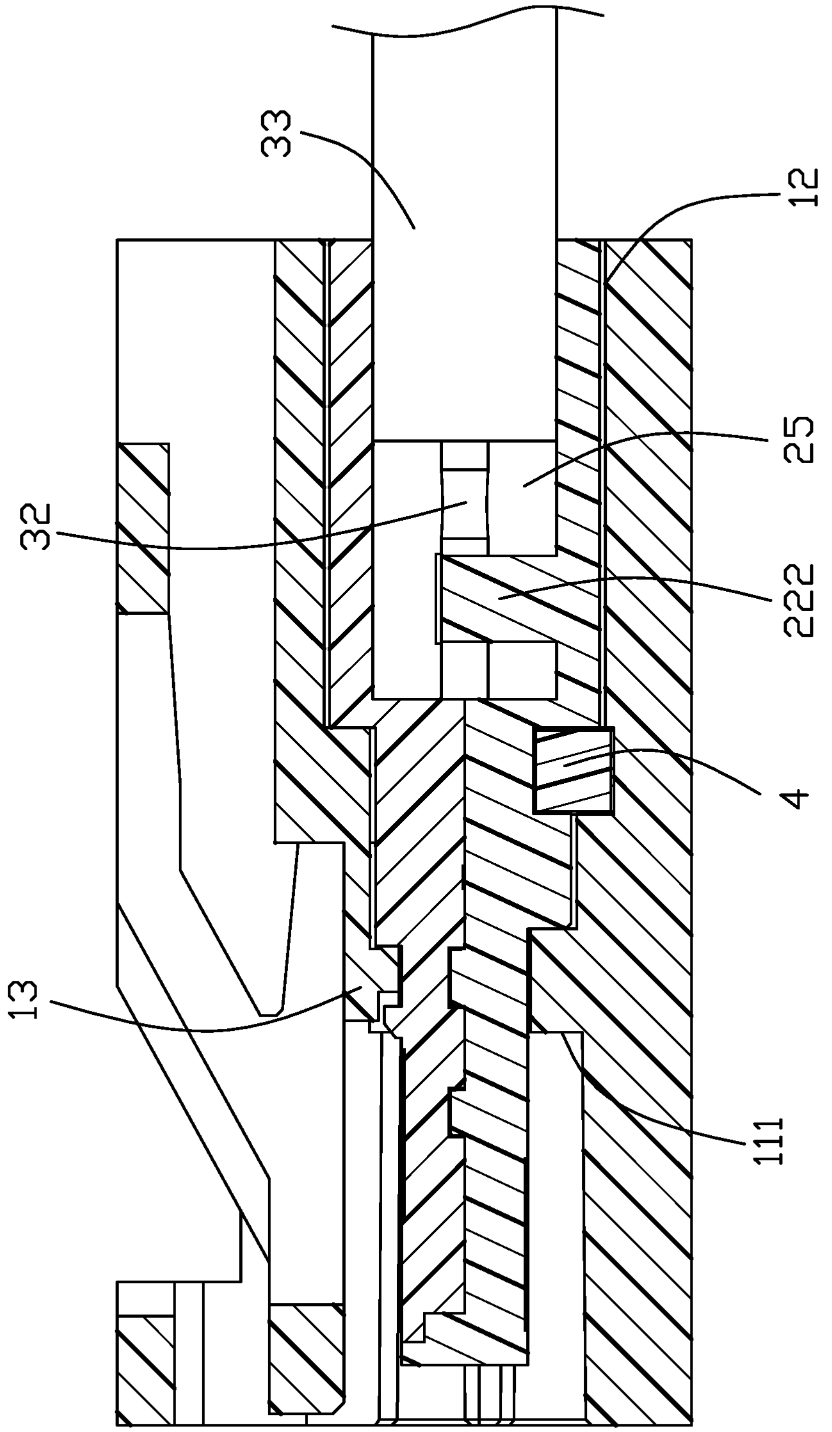
FIG. 9 is a cross-sectional view of the cable connector taken along lines 9-9 in FIG. 1.

The outer housing 1 defines a mating cavity 11 opening forwards, and a receiving cavity 12 receiving the first and second housing and opening rearwards. As shown in FIG. 7, the outer housing 1 comprises a locking arm 13 extending forwardly and inwardly from a top inside thereof. As shown in FIGS. 5 and 9, the locking arm 13 is located behind a rear surface 111 of the mating cavity 11, the first housing 21 defines a locking space 215 receiving the locking arm 13. The locking arm 13 and the locking space 215 can ensure that the inner housing 2 is installed in place, and can also limit the inner housing 2 along the front to rear direction.

While a preferred embodiment in accordance with the present disclosure has been shown and described, equivalent modifications and changes known to persons skilled in the art according to the spirit of the present disclosure are considered within the scope of the present disclosure as described in the appended claims.

What is claimed is:

1. A cable connector comprising:

an outer housing;

an inner housing retained in the outer housing and comprising a first housing and a second housing assembled with each other and commonly defining two front passageways and a rear passageway behind the two front passageways; and a cable assembly retained between the first housing and the second housing, the cable assembly comprising a pair of terminals, a pair of wires connected with corresponding terminals, respectively, and a sleeve wrapping the two wires, the terminals and the wires being accommodated within the front passageways, the sleeve being accommodated within the rear passageway;

wherein the second housing defines a group of first holding portions for holding the wires, and each of the first housing and the second housing defines a group of second holding portions for commonly holding the sleeve;

wherein the terminal comprises a contacting portion, a middle portion, a wire-connecting portion extending from the middle portion, and a shrinking portion between the contacting portion and the middle portion, the shrinking portion has a smaller diameter than that of the contacting portion and that of the middle portion, and the front passageways are shaped corresponding to the terminals; and wherein a rear end of the contacting portion of each of the pair of terminals extends rearward to form two abutting portions pressing rearward against a step defined on a corresponding front passageway.

2. The cable connector as claimed in claim 1, wherein the sleeve defines a pair of slots at opposite sides thereof, the group of second holding portions comprises two protrusions at two opposite inner sides of the rear passageway on each of the first housing and the second housing, and the two protrusions at same inner sides are received in a corresponding slot.

3. The cable connector as claimed in claim 2, wherein the first holding portion is formed integrally or assembled with the second housing.

4. The cable connector as claimed in claim 1, wherein the second housing further comprises two groups of third holding portions holding corresponding contacting portions and corresponding middle portions of the pair of terminals, respectively.

5. The cable connector as claimed in claim 4, wherein the third holding portions extend upwards beyond the front passageways and are received in corresponding recesses defined on the first housing.

6. The cable connector as claimed in claim 1, wherein the outer housing defines a mating cavity opening forwards and a receiving cavity receiving the inner housing and opening rearwards, and the outer housing further defines a locking arm extending forwardly and inwardly to lock with a locking space defined on the inner housing.

* * * * *